(No Model.)  6 Sheets—Sheet 1.
W. H. MORGAN.
ELECTRIC CONTROLLER.

No. 582,663. Patented May 18, 1897.

Witnesses
G. J. Nottingham,
I. F. Downing

Inventor
W. H. Morgan
By H. A. Seymour
Attorney (No Model.)  6 Sheets—Sheet 3.

W. H. MORGAN.
ELECTRIC CONTROLLER.

No. 582,663.  Patented May 18, 1897.

Witnesses
E. J. Nottingham
G. F. Downing

Inventor
W. H. Morgan
By H. A. Seymour
Attorney (No Model.) 6 Sheets—Sheet 4.
W. H. MORGAN.
ELECTRIC CONTROLLER.

No. 582,663. Patented May 18, 1897.

Witnesses
E. J. Nottingham
G. F. Downing

Inventor
W. H. Morgan
By H. A. Seymour
Attorney (No Model.) 6 Sheets—Sheet 5.

W. H. MORGAN.
ELECTRIC CONTROLLER.

No. 582,663. Patented May 18, 1897.

Witnesses
E. J. Nottingham.
G. F. Downing.

Inventor
W. H. Morgan
By H. A. Seymour
Attorney (No Model.) 6 Sheets—Sheet 6.
W. H. MORGAN.
ELECTRIC CONTROLLER.

No. 582,663. Patented May 18, 1897.

Witnesses
E. J. Nottingham
G. F. Downing

Inventor
W. H. Morgan
By H. A. Seymour
Attorney

UNITED STATES PATENT OFFICE.

WILLIAM HENRY MORGAN, OF ALLIANCE, OHIO.

ELECTRIC CONTROLLER.

SPECIFICATION forming part of Letters Patent No. 582,663, dated May 18, 1897.

Application filed November 14, 1896. Serial No. 612,147. (No model.)

*To all whom it may concern:*

Be it known that I, WILLIAM HENRY MORGAN, of Alliance, in the county of Stark and State of Ohio, have invented certain new and useful Improvements in Electric Controllers; and I do hereby declare the following to be a full, clear, and exact description of the invention, such as will enable others skilled in the art to which it appertains to make and use the same.

My invention relates to an improvement in electric controllers, one object of the invention being to so construct the apparatus that the contact-arm of the rheostat will be turned in the same direction when the operating-lever is moved in either direction from its normal position, thus rendering it possible to employ a graduated resistance.

A further object is to construct the apparatus in such manner that the motion of the contact-arm of the rheostat shall be accelerated when it approaches the forward end of its movement.

A further object is to improve and simplify the general construction of the controller and to so construct it that it shall be effectual in all respects in the performance of its functions.

With these objects in view the invention consists in certain novel features of construction and combinations and arrangements of parts, as hereinafter set forth, and pointed out in the claims.

Figure 1:
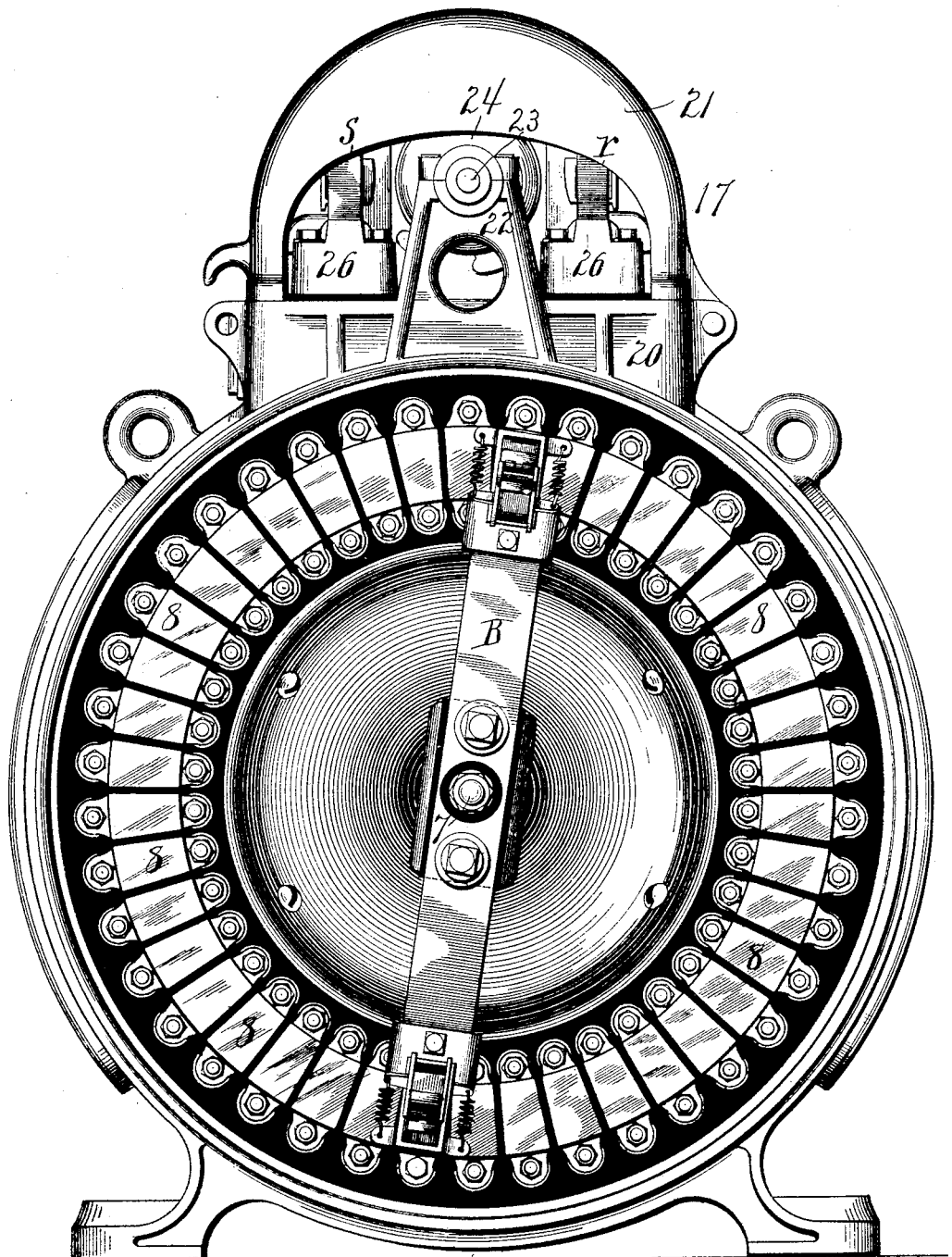
Figure 2:
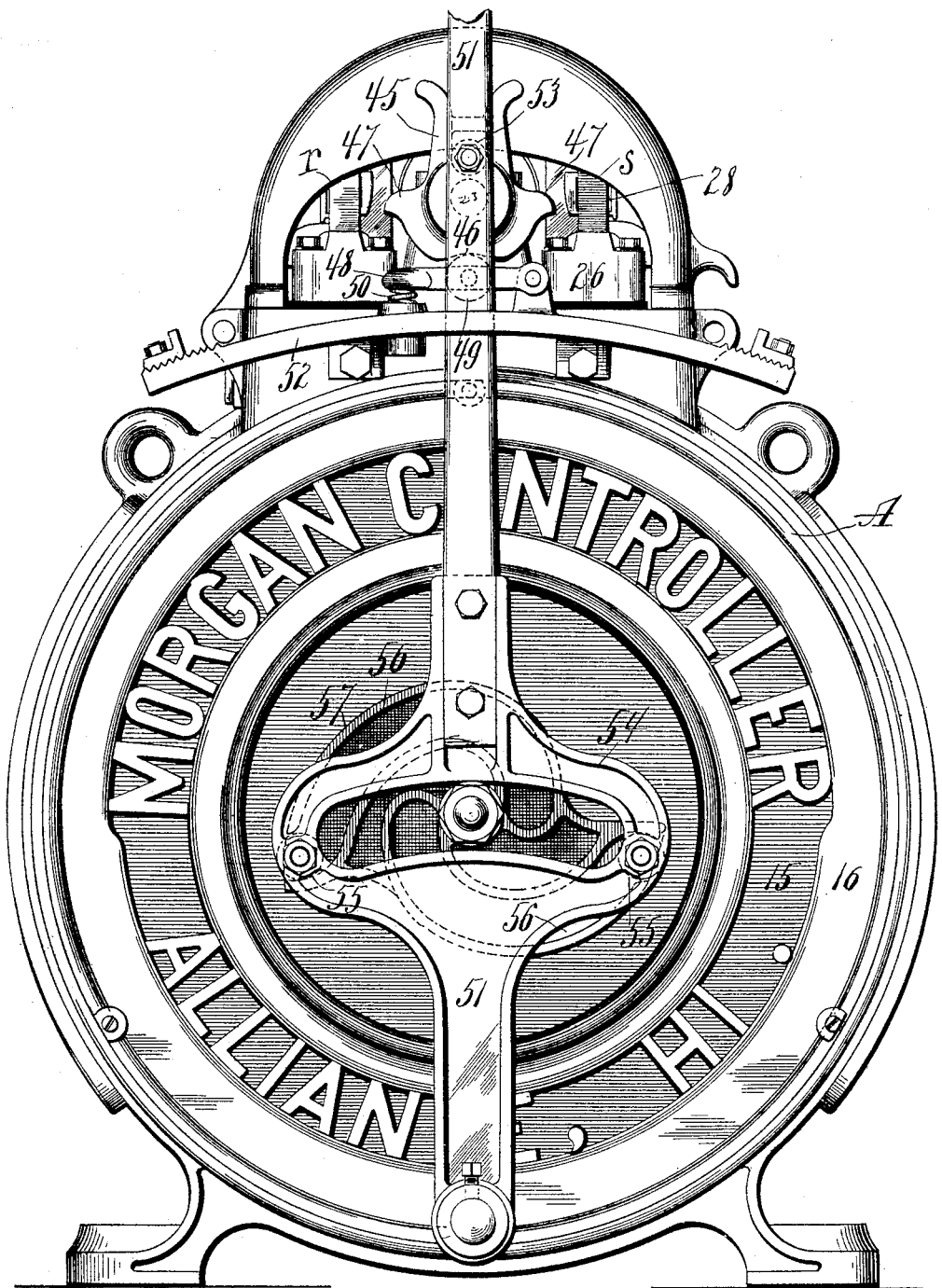
Figure 3:
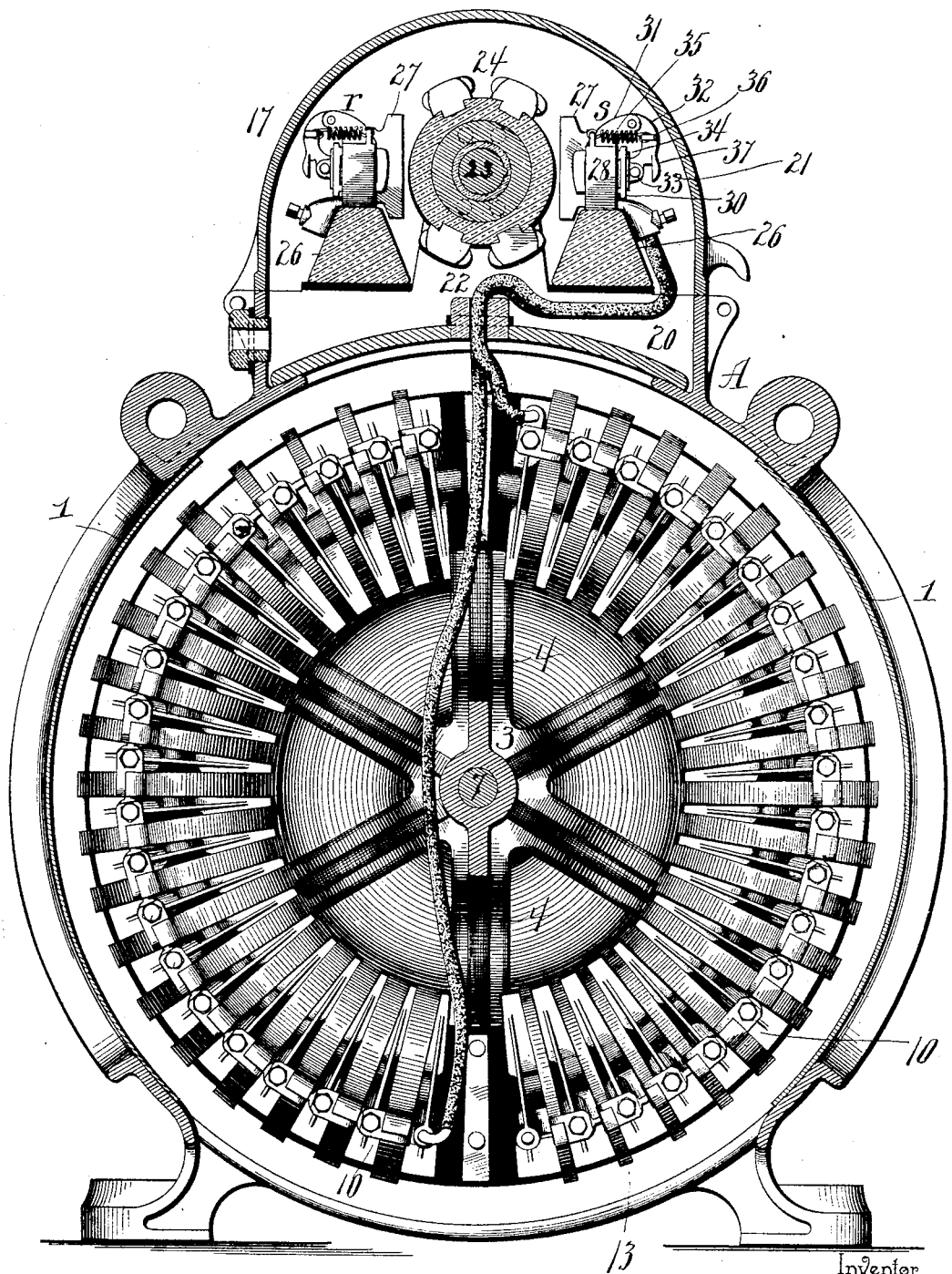
Figure 4:
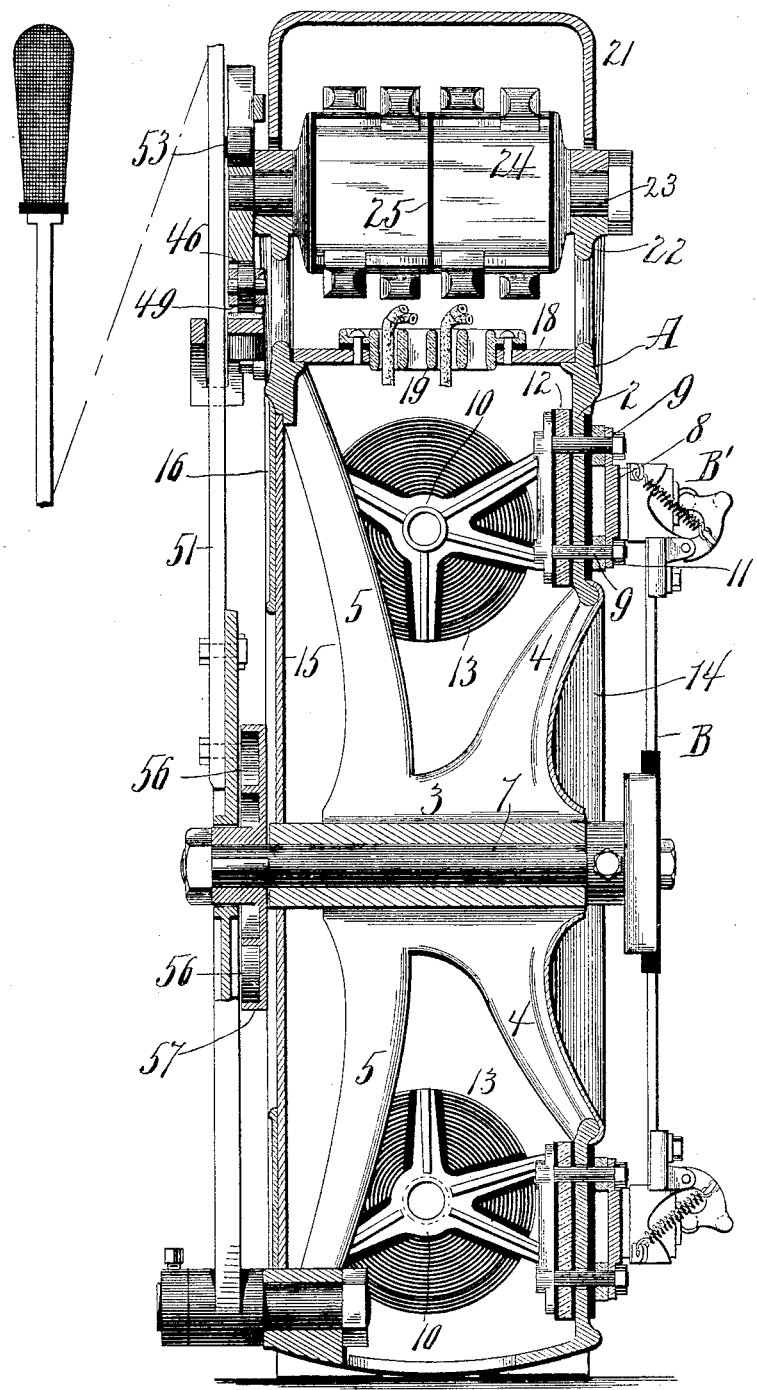
Figure 5:
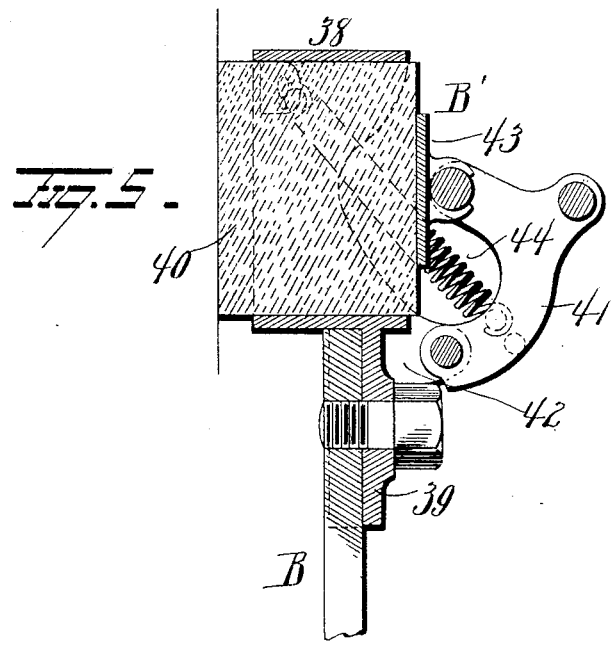
Figure 6:
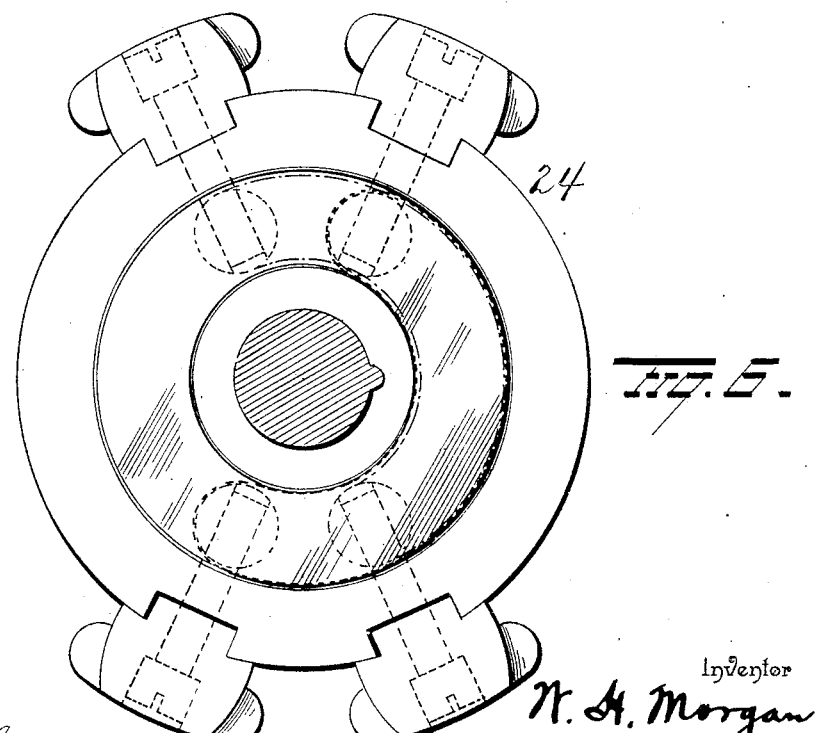
Figure 7:
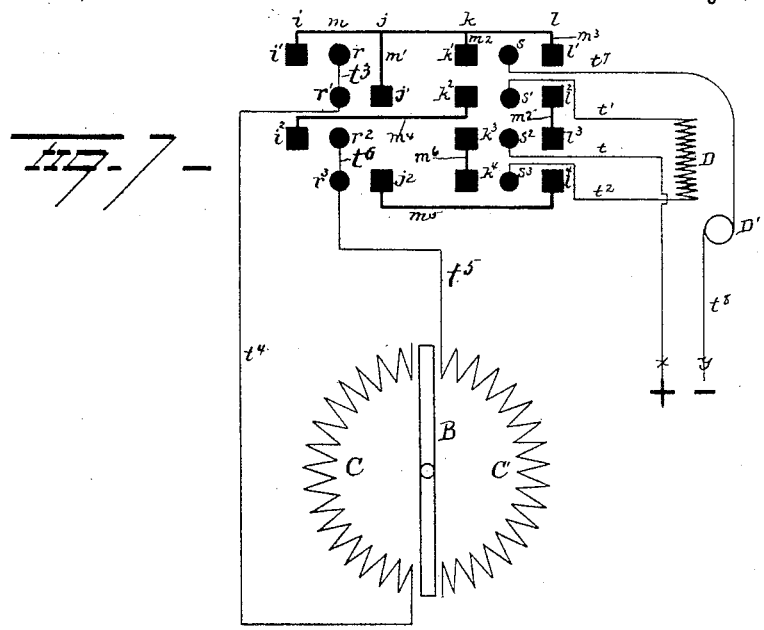
Figure 8:
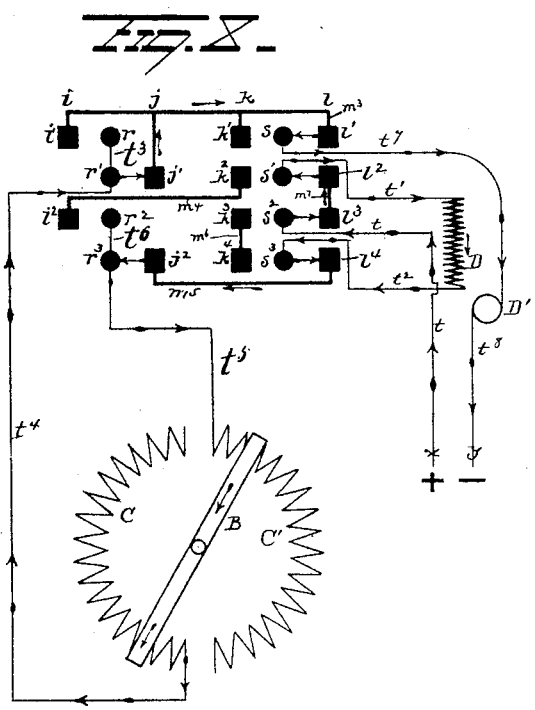
Figure 9:
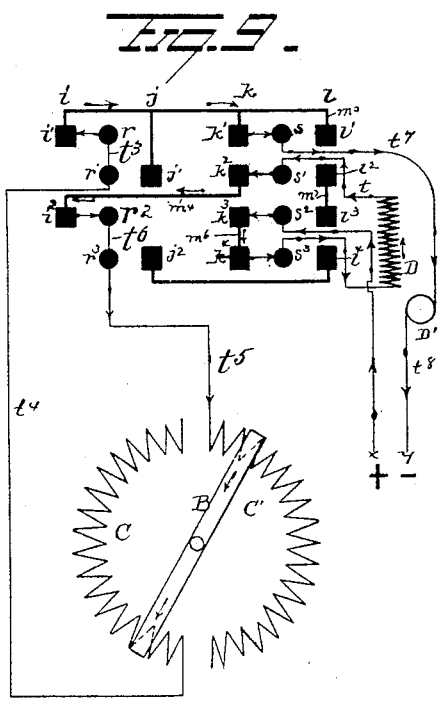

In the accompanying drawings, Figure 1 is a side elevation. Fig. 2 is a similar view from the other side of the machine. Figs. 3 and 4 are sectional views. Figs. 5 and 6 are detail views, and Figs. 7, 8, and 9 are diagrammatical views.

A represents an annular frame or shell made in a single casting and preferably having peripheral openings whereby to reduce the weight of the apparatus. Some of these openings will be closed by means of sheet-iron 1, whereby to protect the resistance-coils located within the shell, and through the bottom opening air may enter for the purpose of ventilation. One side of the shell A is made with an inwardly-projecting integral flange or ring 2, and within said flange or ring a spider 3 is disposed, the arms 4 of said spider being made integral with the flange or ring 2.

The spider 3 is disposed transversely in the center of the shell and is braced by means of arms 5, extending to and made integral with the shell at points above and below the spider.

The spider serves as a bearing for a transverse shaft 7, to one end of which a switch-arm B is secured, but insulated therefrom. Contact devices or brushes B' are secured to the respective ends of the switch-arm B and are adapted to move over a series of contact-plates 8, mounted on suitable insulation on the ring or flange 2. The contact-plates 8 are adapted to receive the ends of arms 9, projecting from an annular series of frames 10, located within the shell A. Each frame 10 is made with two arms 9, which pass through perforations in the ends of the contact-plates, and the free ends of said arms are screw-threaded for the reception of nuts 11. The frames 10 are also seated on blocks 12, of insulating material, bearing against the inner face of the ring or flange 2. Thus the frames 10 and contact-plates 8 are supported by but insulated from the ring or flange 2 and electrically connected together. Each frame 10 is adapted to support a coil 13 (preferably metallic ribbon) of resistance material, said frames also serving to space the resistance-coils apart, whereby to permit a free circulation of air between them.

The resistance-coils are arranged in the form of a ring divided into two semicircular sets, so that brushes on the ends of the contact-arm B will bear simultaneously on contact-plates of the two sets of resistance-coils and thus cut in or out two coils at a time when said switch-arm is moved. The coils at one end of each set are made smaller—*i. e.*, composed of a less amount of metal—than the remaining coils for a purpose which will be hereinafter more fully explained.

The side of the frame or shell A having the flange or ring 2 is preferably closed by means of a sheet-metal plate 14, and the opposite side of the frame or shell is closed by a sheet-metal plate 15 and ring or casting 16 of open-work.

A housing 17 for a reversing-switch is located on top of the shell A, which latter is closed at this point by a plate 18, through which conductors are passed, a perforated insulating-plate 19 being secured to said plate.

The housing 17 comprises a base portion 20 and a hinged cover 21, the base portion being made with standards 22, which constitute bearings for the shaft 23 of the drum 24 of the reversing-switch. The drum 24 is made of insulating material, preferably porcelain, and may be composed of two sections separated by an insulating-disk 25.

To the drum 24 four series $i\ j\ k\ l$ of contact-blocks are secured, and in order to electrically connect certain of the contact-blocks the drum is made with longitudinal perforations for the reception of a series of electrical connectors. The block $i'$ of the series $i$ is electrically connected with the block $j'$ of series $j$ by means of a conductor $m\ m'$, with the block $k'$ of series $k$ by means of a conductor $m\ m^2$, and with the block $l'$ of series $l$ by means of conductor $m\ m^3$. Block $i^2$ of series $i$ is connected with block $k^2$ of series $k$ by means of a conductor $m^4$. Block $j^2$ of series $j$ is connected with block $l^4$ of series $l$ by means of a conductor $m^5$. Blocks $k^3$ and $k^4$ are connected by a conductor $m^6$, and blocks $l^2$ and $l^3$ are connected by a conductor $m^7$.

On the base portion 20 of the housing at opposite sides of the standards 22 porcelain blocks 26 are mounted, each of which supports a series of contact devices or brushes insulated from each other by means of porcelain plates 27. These contact devices or brushes are thus arranged in two groups $r\ r'\ r^2\ r^3$ and $s\ s'\ s^2\ s^3$ at the respective sides of the drum 24, and each comprises a frame 28, in which a transverse contact block or brush 29 is loosely mounted and free to move in one direction when engaged by the contact-blocks on the drum and limited in its movement in the other direction by flanges 30, which abut against the frame 28. Lugs 31 project upwardly and outwardly from each frame 28, and between their free ends an arm 32 is pivotally connected. Each arm 32 is provided at its free end with laterally-projecting pintles 33, to which a plate 34 is loosely connected and adapted to bear against the outer ends of the contact block or brush 29, against which it is held with a yielding pressure by means of springs 35, one end of each of which is attached to the frame 28 and the other end to lugs 36, projecting laterally from the arm 32 at points between the ends of the latter. Each arm 32 is preferably made with a thumb-piece 37. The contact devices B' of the rheostat are somewhat similar in construction. Each contact device B' comprises a frame 38, having an arm 39, secured to the switch-arm B. In each frame 38 a block or brush 40 of carbon is loosely mounted and adapted to bear against the contact-plates 8. An arm 41 is pivotally connected between lugs 42 on the frame 38, and to the free end of this arm a plate 43 is loosely connected and made to bear against the carbon-brush with a yielding pressure by means of springs 44, one end of each of which is connected to the frame 38 and the other end to the arm 41.

On one end of the shaft 23 of the drum 24 bifurcated arm 45 is secured and made with a curved lower edge having a depression 46 between its ends and having stops 47 at its ends. A short bar 48 is pivoted at one end to the shell A and provided between its ends with a roller 49 to bear against the curved under edge of the arm 45, against which it is forced with a yielding pressure by means of a spring 50, inserted under the free end of the bar 48. From this construction it will be seen that the action of the spring-pressed bar 48 will be to retain the drum against accidental movement, and the roller 49 will constitute an abutment for the stops 47, whereby to limit the movements of the drum.

In order to operate the rheostat and reversing-switch simultaneously and without subjecting parts of the apparatus to injury from sparking at the contacts, the appliances now to be described will be employed. A lever 51 is pivotally connected to the lower part of the shell A and adapted to be guided by a slotted arm 52, secured to the upper part of said shell, said lever being provided with a pin 53 to enter the bifurcated arm 45 and operate the reversing-switch.

Between its ends the lever 51 is made with a lateral enlargement or elongated portion 54, at the respective ends of which rollers 55 are mounted and adapted to enter cam-grooves 56 56, made in a plate 57, secured to the shaft 7.

It will be seen that the lever 51 is so constructed and the rollers so located with relation to cam-grooves that when the lever is in a vertical position or medial point each roller rests opposite and adjacent to the open mouth of its respective cam-groove. Hence when the lever is moved in one direction, say toward the right, one of the rollers enters its groove and, bearing against the side flanges or walls thereof, turns the cam and with it the contact-arm shaft on which the cam is secured. By reversing the direction of movement of the actuating-lever, so as to bring it back to its normal position or medial point, the direction of rotation of the cam is reversed and the contact-arm restored to its normal position. If now the actuating-lever be moved toward the left, the other roller enters its cam-groove and, bearing against the walls thereof, turns the cam in the direction it turned when the lever was moved from its medial point to the right. Thus it will be seen that the cam, shaft, and contact-arm are moved in the same direction irrespective of the direction of movement of the lever from its normal or medial point.

The shape of the cam-grooves is such that the motion of the contact-arm is not uniform for a given or uniform motion of the actuating-lever. Thus if we divide the distance between the medial or normal position of the lever and its limit of its outward throw in either direction into two equal parts and move the lever at a uniform speed throughout the entire throw the contact-arm would move a less distance in the first half of the throw than in the last half.

By the use of the construction of operating devices above described I am enabled to employ a graduated resistance, as hereinbefore mentioned, which is a great advantage.

When the drum is oscillated in one direction or the other, either the series of contact-blocks $i\,k$ or the series $j\,l$ will make electrical contact with the contact devices of the reversing-switch, whereby to cause the current to flow in one direction or the other through the field-magnet coils of an electric motor and cause the operation of the latter in one direction or the other, all of which will be more fully explained in the following description of the circuits.

In the diagrammatical views, X Y represent the line-wires. The wire X is connected with the contact-arm $s^2$ by means of a wire $t$. The contact-arm $s'$ is connected with one end of the field-magnet coil D of an electric motor by means of a wire $t'$. The other end of said field-magnet coil is connected by a wire $t^2$ with the contact-arm $s^3$. The contact-arm $r'$ is connected with one end of the set C of resistance-coils by a wire $t^4$, and the contact-arm $r'$ is connected with the contact-arm $r$ by a conductor $t^3$. The contact-arm $r^3$ is connected with one end of the set C' of resistance-coils by means of a wire $t^5$, and the contact-arm $r^3$ is connected with the contact-arm $r^2$ by a conductor $t^6$. The contact-arm $s$ is connected by a wire $t^7$ with one of the commutator-brushes of the armature D' of the motor, and the other commutator-brush is connected with the minus line-wire Y by a wire $t^8$.

When the operating-lever is in its normal or intermediate position, the circuit through the apparatus will be open, and the connections will be as above explained and shown in Fig. 7.

When the operating-lever is first moved from its normal position in one direction or the other, the circuit will be closed, including the entire resistance; but as the movement of the lever is continued over the contact-plates of the resistance-coils the said coils will be gradually cut out of circuit, two at a time, as the movement of the switch-arm continues. By moving the operating-lever back and forth the number of resistance-coils included in the motor-circuit can be varied to regulate the speed of the motor, as desired.

When the reversing-switch is thrown in one direction, the circuit will be traced as shown by the arrows in Fig. 8, and when the switch is thrown in the other direction the circuit through the switch will be as indicated by the arrows in Fig. 9.

With the position of parts as shown in Fig. 8 the circuit will be as follows: from the leading-in wire X to contact-arm $s^2$ by conductor $t$, then to contact-block $l^3$, then to block $l^2$, then to contact-arm $s'$, by wire $t'$ to field-magnet coil D of motor, then by wire $t^2$ to contact-arm $s^3$, to block $l^4$, to block $j^2$, to contact-arm $r^3$, to set C' of resistance-coils, through switch-arm B to set C of resistance-coils, by conductor $t^4$ to contact-arm $r'$, to block $j'$, to block $l'$, to contact-arm $s$, then by conductor $t^7$ to armature D', and then by conductor $t^8$ to line Y.

When the motor is to be run in the reverse direction, the operating-lever will be moved to throw the reversing-switch to cause a reversal of the direction of the current through the field-magnet coils, and under such conditions the circuit can be traced as follows and as shown in Fig. 9:

The current will enter the controller at the contact-arm $s^2$, as above described, but the drum of the switch having been oscillated the relations of the contact-blocks to the contact-arms have been changed, and the current will pass from the arm $s^2$ to the contact-block $k^3$, then to block $k^4$, then to contact-arm $s^3$, to field-magnet coil by wire $t^2$, from field-magnet coil by wire $t$ to contact-arm $s'$, to contact-block $k^2$, to block $i^2$, to contact-arm $r^2$, through conductor $t^6$ and arm $r^3$ to set C' of resistance-coils, through more or less of said coils to switch-arm B, through said switch-arm to the set of coils C, through more or less of the set of coils C, then by wire $t^4$ to contact-arm $r'$, through conductor $t^3$ and contact-arm $r$ to block $i'$, to block $k'$, to contact-arm $s$, then to armature of motor by wire $t^7$, and from the armature to the minus line-wire by the wire $t^8$.

It is evident that instead of reversing the current through the field-magnet coils of the motor, as above described, the connections in the reversing-switch could be so arranged as to cause the current through the armature to be reversed to reverse the motor.

Having fully described my invention, what I claim as new, and desire to secure by Letters Patent, is—

1. In an electric controller, the combination with a shell or frame, of an annular series of coils therein, said coils arranged in two semicircular sets, the coils at one end of each set being adapted to offer less resistance than the coils at the other end, contact-plates connected to said coils and a contact or switch arm adapted to be moved over said contact-plates and cut the coils into or out of circuit, two at a time.

2. In an electric controller, the combination with a set of resistance-coils, the coils at one end of the series adapted to offer less resistance than the coils at the other end of the series, contact-plates connected with said coils, a contact or switch arm to move over said contact-plates and devices constructed to operate said switch-arm so as to cause the latter part of its movement to be accelerated, substantially as set forth.

3. In an electric controller, the combination with a shell or frame, of an annular series of resistance-coils therein, divided into two sets, the coils at one end of each set being of greater resistance than the coils at the other end and contact-plates connected with said coils, of a contact or switch arm adapted to bear on a contact-plate of each set simultaneously, an operating-lever, and connections between said operating-lever and contact or switch arm, whereby to cause the contact or switch arm to move over the contact-plate in the same direction, regardless of the direction the operating-lever is moved from its normal position.

4. In an electric controller, the combination with a frame or shell, resistance-coils therein, and contact-plates for said resistance-coils, of a reversing-switch, and a lever adapted to operate said reversing-switch, said lever having lateral enlargements between its ends, rollers on said enlargements, a shaft, a contact-arm on said shaft to engage said contact-plates, and a plate secured to said shaft and having two cam-grooves to receive the rollers on said lever whereby to cause the contact-arm to be moved in the same direction, regardless of the direction of movement of said lever from its normal position, substantially as set forth.

5. In an electric controller, the combination with an open shell having a ring or flange at one side, a spider made integral with said ring or flange and braces for said spider made integral with the shell, of frames secured to said ring or flange and insulated therefrom, contact-plates attached to said frames, a shaft mounted in said spider, means for operating said shaft, a contact-arm secured to said shaft and having contact-brushes to move over said contact-plates, and sheet-metal plates closing the open portions of the shell, substantially as set forth.

In testimony whereof I have signed this specification in the presence of two subscribing witnesses.

WILLIAM HENRY MORGAN.

Witnesses:
JOHN H. LLOYD,
W. G. HILDEBRAN.